(12) United States Patent
Lee et al.

(10) Patent No.: US 8,289,328 B2
(45) Date of Patent: Oct. 16, 2012

(54) CONTENT INFORMATION DISPLAY METHOD AND APPARATUS

(75) Inventors: Jung-kun Lee, Suwon-si (KR); Young-mi Kang, Yongin-si (KR); Hye-rin Kim, Seoul (KR); Ju-il Um, Suwon-si (KR); Young-shil Jang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 676 days.

(21) Appl. No.: 12/100,494

(22) Filed: Apr. 10, 2008

(65) Prior Publication Data

US 2009/0040228 A1 Feb. 12, 2009

(30) Foreign Application Priority Data

Aug. 7, 2007 (KR) .................. 10-2007-0079141

(51) Int. Cl.
*G06T 11/20* (2006.01)
*G06F 3/048* (2006.01)

(52) U.S. Cl. .......... 345/440; 345/440.2; 715/763; 715/810

(58) Field of Classification Search .......... 345/440, 345/440.2; 715/763, 810, 830
See application file for complete search history.

(56) References Cited

U.S. PATENT DOCUMENTS

| | | | |
|---|---|---|---|
| 2002/0029230 A1* | 3/2002 | Takiguchi et al. | 707/500.1 |
| 2009/0012959 A1* | 1/2009 | Ylivainio et al. | 715/763 |
| 2009/0158214 A1* | 6/2009 | Arnold et al. | 715/830 |
| 2009/0251458 A1* | 10/2009 | Kondo et al. | 345/418 |
| 2010/0313166 A1* | 12/2010 | Nakayama et al. | 715/810 |

* cited by examiner

*Primary Examiner* — Chante Harrison
(74) *Attorney, Agent, or Firm* — Sughrue Mion, PLLC

(57) ABSTRACT

Provided are a content information display method and apparatus. The method includes: extracting a content file list; extracting additional information having a same property from among additional information on each of content files included in the content file list; generating a graph representing a degree of the property by comparing the extracted additional information on each content file with additional information on another content file; and displaying the graph and the content file list.

23 Claims, 5 Drawing Sheets

FIG. 4A

1. Line up
2. Amazing
3. Boogie Man
4. Crazy
5. Crying
6. Fever

CONTENT FILE LIST SCREEN
410

FIG. 4B

ADDITIONAL INFORMATION GRAPH SCREEN
420

FIG. 4C

REPRODUCTION TIME — 435

1. Line up
2. Amazing
3. Boogie Man
4. Crazy
5. Crying
6. Fever

CONTENT INFORMATION DISPLAY SCREEN — 430

CONTENT INFORMATION DISPLAY METHOD AND APPARATUS

CROSS-REFERENCE TO RELATED PATENT APPLICATION

This application claims priority from Korean Patent Application No. 10-2007-0079141, filed on Aug. 7, 2007 in the Korean Intellectual Property Office, the disclosure of which is incorporated herein in its entirety by reference.

BACKGROUND OF THE INVENTION

1. Field of the Invention

Methods and apparatuses consistent with the present invention relate to display of content information.

2. Description of the Related Art

Development of digital technology has facilitated the introduction of small-sized digital devices. Development of memory capacity also has facilitated the introduction of reproduction devices having large-capacity memories. A plurality of pieces of content can be stored in reproduction devices owing to large-capacity memories. Reproduction devices can manage content stored therein in the form of a file and display content file lists. Reproduction devices can display titles, capacity, reproduction time of content files, or the like by using text information.

Small-sized reproduction devices involve small-sized output screens that can merely display limited main information such as titles of content files via content file lists.

SUMMARY OF THE INVENTION

The present invention provides a content information display method and apparatus for efficiently displaying a plurality of pieces of additional information of a content file when a content file list is displayed.

The present invention also provides a content information display method and apparatus for displaying both main information and additional information on a content file when a content file list is displayed on a small-sized screen due to a small-sized reproduction device.

The present invention also provides a content information display method and apparatus for displaying additional information on a content file using a graph when a content file list is displayed.

According to an aspect of the present invention, there is provided a method of displaying content information performed in a user terminal, the method comprising: extracting a content file list; extracting additional information having a same property from among additional information on each of content files included in the content file list; generating a graph representing a degree of the property by comparing the extracted additional information on each content file with additional information on another content file; and displaying the graph and the content file list.

The content file list may be in the form of a text file, wherein the displaying of the graph and the content file list comprises: combining the graph and the content file list in the form of the text file.

The method may further comprise: receiving a selected property of the additional information, wherein the extracting of the additional information comprises: extracting additional information having the selected property.

The displaying of the graph and the content file list may comprise: outputting a type of the property of the additional information generated as the graph.

The method may further comprise: receiving a request for using one of the content files; generating content file usage habit information in response to the request; and storing the content file usage habit information as additional information on the content file whose usage is requested.

The additional information may comprise more than one of a license date, volume, reproduction time or information on a generator of the content file, a reproduction frequency of the content file, preference regarding the content file that is input by a user of the user terminal, a date of storing the content file, a date of editing the content file by the user of the user terminal, and information on a latest reproduction date of the content file.

The content file list may include a name list or an address list, wherein the content file usage habit information comprises information on the number of calls made with a terminal included in the name list or the address list, calling time, or the amount/level of communication with the terminal that is input by the user of the user terminal.

The extracting of the additional information may comprise: extracting additional information on each property from each of content files having a plurality of properties, wherein the generating of the graph comprises: dividing graphs of each of the content files into sections of the number of the plurality of properties, comparing additional information on each content file with additional information on another content file using the additional information on each content file having the same property, and generating and displaying a graph representing the degree of the property in each section.

The extracting of the additional information may comprise: extracting the additional information from metadata on the content file.

The graph may comprise a bar graph, a belt graph, or a picture graph, wherein the generating of the graph further comprises: displaying a degree of the property using more than one of a length, size, color, transparency, brightness, and color depth of the graph.

The transparency, color or size of the graph is used to identify the content file list.

According to another aspect of the present invention, there is provided a user terminal for performing a method of displaying content information, the user terminal comprising: a content information display unit comparing additional information on each of content files included in a content file list with additional information on another content file using the additional information having a same property of each content file, generating a graph representing a degree of the property, and displaying the graph and the content file list; a controller controlling the user terminal to perform the method of displaying content information; a memory unit storing the content file list and the additional information on each content file; and a user interface transferring a user's request to the user terminal.

The content information display unit may comprise: a content file list extracting unit extracting a content file list; an additional information extracting unit extracting additional information having the same property among additional information on each of content files included in the content file list; a graph generating unit generating a graph representing the degree of the property by comparing the extracted additional information on each content file with additional information on another content file; a display information combining unit combining the graph and the content file list; and an outputting unit displaying the graph and the content file list.

The content file list may be in the form of a text file, wherein the output unit displays the graph by overlapping the graph and the content file list in the form of the text file.

The controller may receive a selected property of the additional information through the user interface, wherein the additional information extracting unit extracts additional information having the selected property.

The output unit may output a type of the property of the additional information generated as the graph.

The user interface may receive a request for using the content files from a user of the user terminal, wherein the user terminal further comprises: a content file usage habit information generating unit generating content file usage habit information in response to the request.

The additional information may comprise more than one of a license date, a volume, a reproduction time or information on a generator of the content file, a reproduction frequency of the content file, a preference regarding the content file that is input by a user of the user terminal, a date of storing the content file, a date of editing the content file by the user of the user terminal, and information on the latest reproduction date of the content file.

The content file list may include a name list or an address list, wherein the content file usage habit information comprises information on the number of calls made with a terminal included in the person list or the address list, calling time, or the amount/level of communication with the terminal that is input by the user of the user terminal.

The additional information extracting unit may extract additional information on each property from each of content files having a plurality of properties, wherein the graph generating unit divides graphs of each of the content files into sections of the number of the plurality of properties, compares additional information on each content file with additional information on another content file using the additional information on each content file having the same property, and generates and displays a graph representing the degree of the property in each section.

The additional information extracting unit may extract the additional information from metadata on the content file.

The graph may comprise a bar graph, a belt graph, or a picture graph, wherein the graph generating unit displays a degree of the property using more than one of length, size, color, transparency, brightness, and color depth of the graph.

A transparency, color or size of the graph may be used to identify the content file list.

BRIEF DESCRIPTION OF THE DRAWINGS

The above and other aspects of the present invention will become more apparent by describing in detail exemplary embodiments thereof with reference to the attached drawings in which:

FIGS. 4A through 4C are diagrams for explaining screens for displaying content information according to an exemplary embodiment of the present invention;

DETAILED DESCRIPTION OF EXEMPLARY EMBODIMENTS OF THE INVENTION

The present invention will be described in detail by explaining preferred exemplary embodiments of the invention with reference to the attached drawings.

Figure 1:
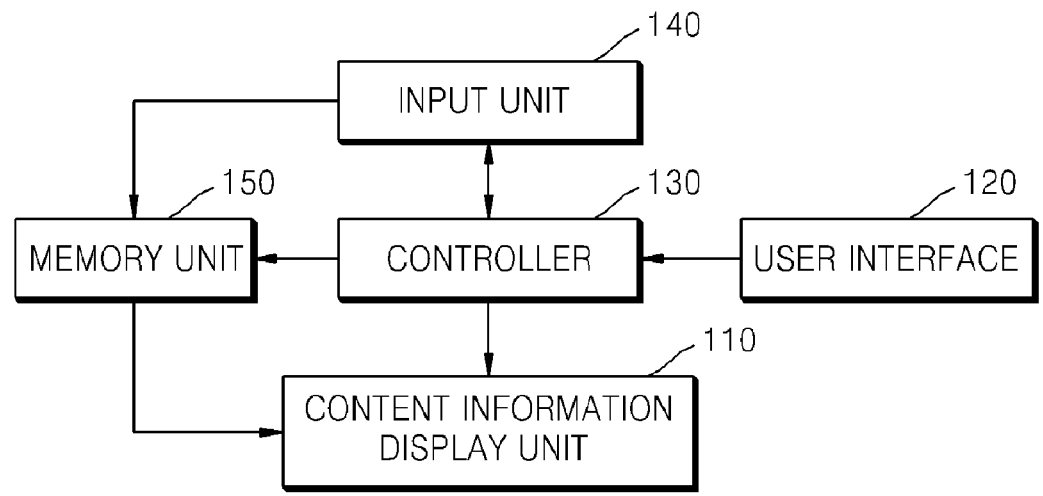
FIG. 1 is a block diagram of a user terminal according to an exemplary embodiment of the present invention.

FIG. 1 is a block diagram of a user terminal according to an exemplary embodiment of the present invention. Referring to FIG. 1, the user terminal comprises a content information display unit 110, a user interface 120, a controller 130, an input unit 140, and a memory unit 150. The user terminal can comprise all devices such as a personal computer (PC), a cellular phone, a television (TV), a personal digital assistant (PDA), a personal multimedia player (PMP), an MP3 player, navigation and the like, which store content as a content file and display a content file list. Content may include an image signal, an audio signal, or a text file. When the user terminal, such as the cellular phone, stores information on a person or a person's terminal, content can include the information on the person or person's terminal stored in a name list or an address list.

The content information display unit 110 outputs content files and additional information on the content files. The content information display unit 110 extracts the same type of additional information on each content file included in a list of the content files to be output from the memory unit 150, and generates a graph indicating the degree of the extracted additional information. The content information display unit 110 displays the generated graph and the list of the content files. The additional information on the content files, which is property information on the content files, is used to efficiently look for content, or is provided to specifically explain content information. The additional information may be stored as meta data with regard to the content files. The additional information may include content capacity, content reproduction time, information on a content creator, content right condition, content use condition, content use history, and the like. Furthermore, the additional information may include variable information generated by a user, such as content reproduction frequency, content user preference, content downloading date or the like.

The user interface 120 receives an instruction, letter, number, or voice information from the user using a physical transducer such as a keyboard, a mouse, a touch pad, or a microphone, and notifies the controller 130 about what is received. The user interface 120 may selectively receive a type of additional information that is to be output as a graph from the user and the content file list. In more detail, when a content file has various types of additional information, the user terminal may selectively receive whichever property of the additional information that is to be output as the graph from the user via the user interface 120.

The controller 130 controls the general operation of the user terminal to perform the content information display method of the present invention. The controller 130 may include an arithmetic logic unit (ALU) for conducting calculations and a register for temporarily storing data and instructions.

The input unit 140 may receive content and the like from an external device (not shown) through a Universal Serial Bus (USB) port or wired/wireless communication. The input unit 140 sends the received information to the memory unit 150. The memory unit 150 receives and stores the information from the input unit 140. The user may record voice or video using the user terminal and generate a content file. At this time, the user may receive voice or video information through the input unit 140.

The memory unit 150 stores the content file, additional information on the content file, and a program or the like necessary for performing the content information file method of the present invention. The memory unit 150 may include storage medium type fast main memory such as a read-only memory (ROM), or a random-access memory (RAM), a long-term storage medium type auxiliary memory such as floppy disks, hard disks, magnetic tapes, CD-ROMs, flash memory, and electrical, magnetic, or optical data storage devices.

Figure 2:
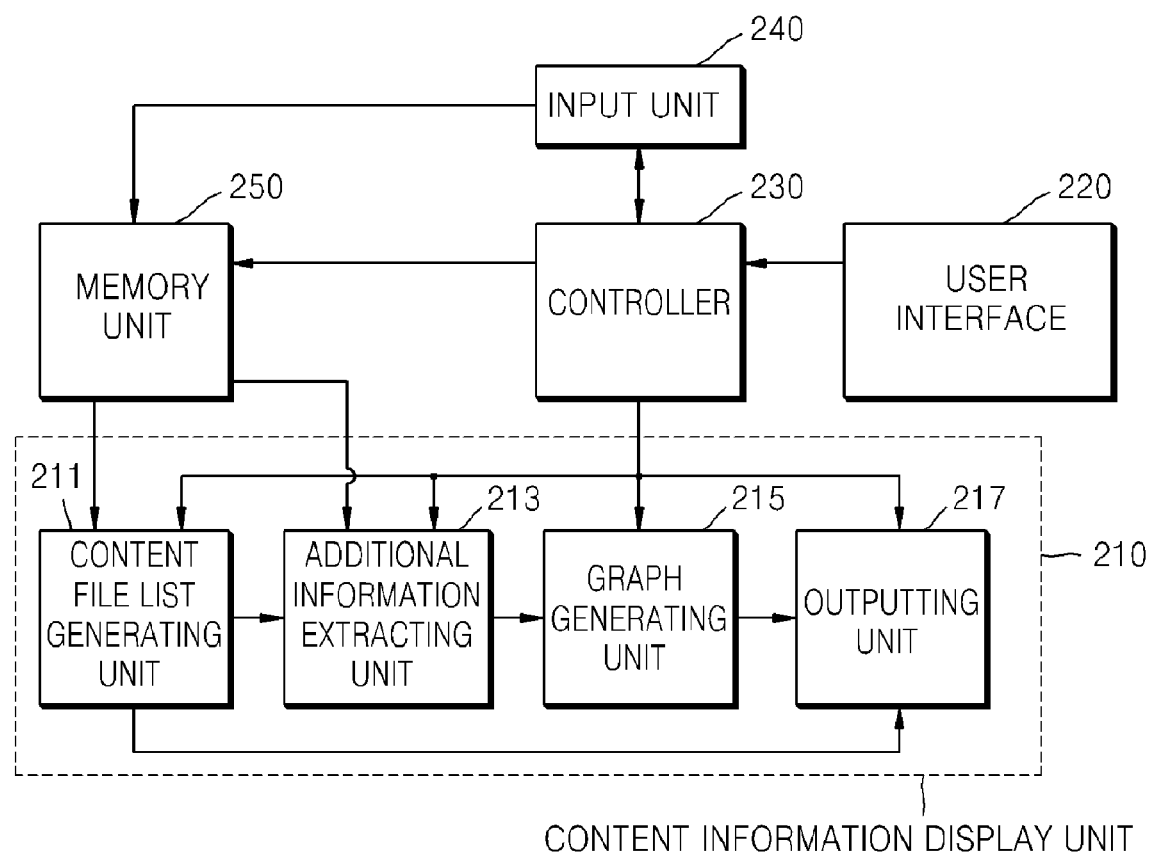
FIG. 2 is a block diagram of a user terminal according to another exemplary embodiment of the present invention.

FIG. 2 is a block diagram of a user terminal according to another exemplary embodiment of the present invention. Referring to FIG. 2, the user terminal comprises a content information display unit 210, a user interface 220, a controller 230, an input unit 240, and a memory unit 250. The user interface 220, the controller 230, the input unit 240, and the memory unit 250 have the same functions as those shown in FIG. 1 and thus their detailed descriptions are not repeated.

The content information display unit 210 comprises a content file list generating unit 211, an additional information extracting unit 213, a graph generating unit 215, and an outputting unit 217. The content file list generating unit 211 extracts a title or the like of each of content files stored in the memory unit 250 and generates a content file list. The content file list may comprise additional information on content files, and may comprise, in particular, text information such as the title of each content file among the additional information. Furthermore, the content file list may comprise other additional information than the title of each content file. For example, a single content file list may comprise additional information such as a name of a content generator or a content reproduction time and a title of the content file. The content file list generating unit 211 sends the generated content file list to the output unit 217.

The additional information extracting unit 213 extracts additional information on each content file included in the content file list extracted from the content file list generating unit 211. When a plurality of pieces of additional information on each content file is stored, the additional information extracting unit 213 may extract each piece of additional information on each content file. At this time, the additional information extracting unit 213 extracts additional information that is not included in the content file list extracted by the content file list generating unit 211. The additional information extracting unit 213 may extract the same type of additional information on each content file among the plurality of pieces of additional information. The user terminal may receive a type of additional information to be generated as a graph from a user through the user interface 220 or a predetermined type of additional information as set default. The additional information extracting unit 213 sends the extracted additional information to the graph generating unit 215.

The graph generating unit 215 generates the graph using the additional information. The graph generating unit 215 ranks the additional information according to the property of the extracted additional information. For example, when the property of the additional information is content file reproduction time, the graph generating unit 215 ranks the additional information in the order of long or short reproduction time according to the reproduction time of each content file. Alternatively, the graph generating unit 215 may compare additional information on each content file with additional information having the same property on a different content file, calculate a relative percentage value, and generate a graph representing the relative percentage value.

The graph generating unit 215 may generate a graph representing long and short reproduction times with regard to each content file list. The graph may include a bar graph, a line graph, or a picture graph. The graph generating unit 215 may represent long or short reproduction time using the length or size of the graph. Alternatively, the graph generating unit 215 may generate bar graphs having the same length with regard to all content and vary the bar graphs in terms of color, transparency, brightness, color depth or the like to represent long or short reproduction time. Since the generated bar graphs and the content file lists are displayed together, they must be identified in terms of transparency, color, size, or the like. The graph generating unit 215 sends the generated graphs to the output unit 217.

The output unit 217 outputs the general status of the user terminal or information input by the user via the user interface 320 or the like by using a screen or a speaker. The output unit 217 may comprise a display unit (not shown) for outputting a video signal among media signals, a speaker (not shown) for outputting an audio signal, and an OSD processor (not shown) for generating a user terminal control list or the like and outputting the user terminal control list or the like. The output unit 217 combines and outputs the content file lists and the graphs received from the content file list generating unit 211 and the graph generating unit 215. The output unit 217 may display a type of additional information that is used to generate the graphs that are output on a screen.

Since a small-sized user terminal outputs additional information on content files and a content file list, the user can obtain information on content files without moving a scroll up and down on the screen. Since a user terminal that a PC, rather than a smaller-sized user terminal, does not need to arrange a plurality of types of additional information but superimposes specific additional information on the content file list using graphs, the user can easily grasp the content file list and specific additional information without having to view the screen from left to right.

Figure 3:
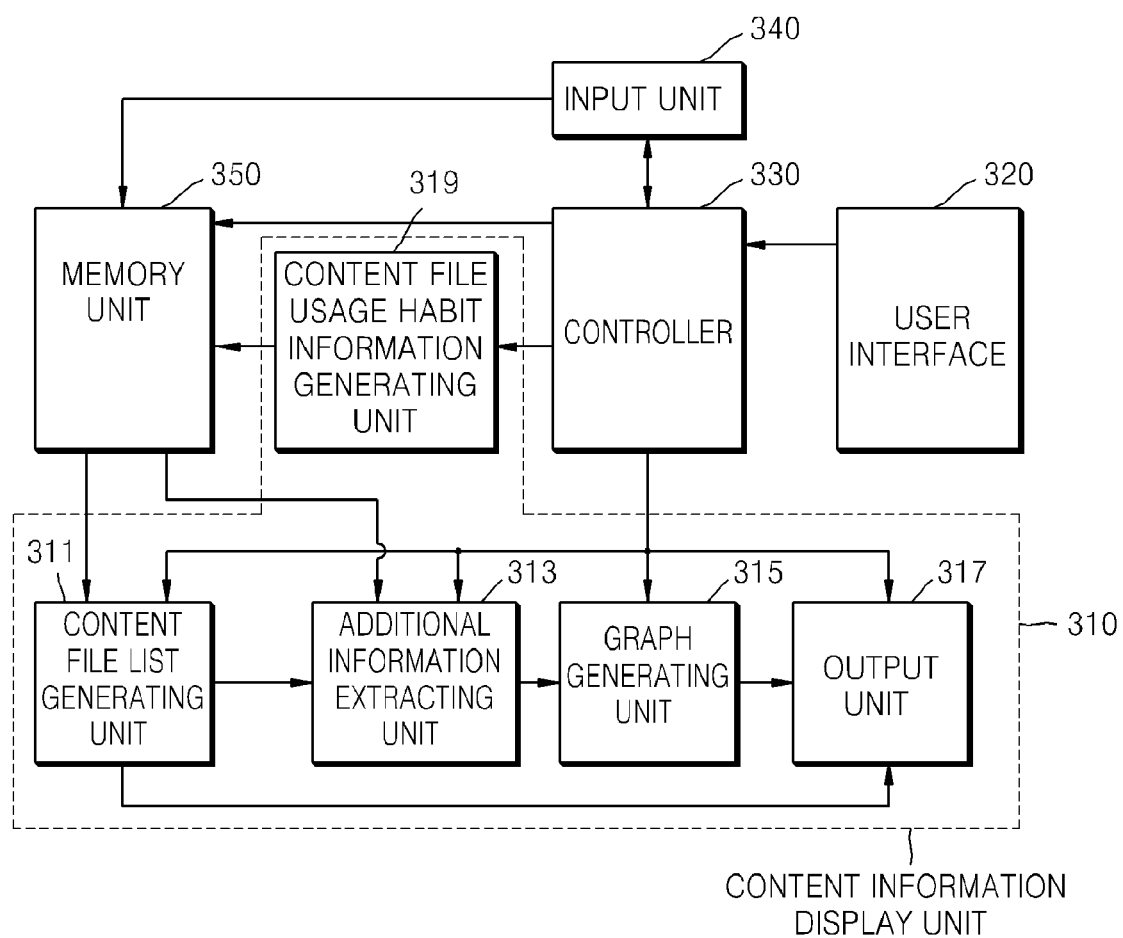
FIG. 3 is a block diagram of a user terminal according to another exemplary embodiment of the present invention.

FIG. 3 is a block diagram of a user terminal according to another exemplary embodiment of the present invention. Referring to FIG. 3, the user terminal comprises a content information display unit 310, a user interface 320, a controller 330, an input unit 340, and a memory unit 350. The content information display unit 310 comprises a content file list generating unit 311, an additional information extracting unit 313, a graph generating unit 315, an output unit 317, and a content file usage habit information generating unit 319. Additional information on a content file may be divided into information such as a content file generator or content file quantity or the like that is generated simultaneously with the generation of a content file, and information generated by a user such as a reproduction frequency or a user preference, as described above. The information generated by the user is referred to as content file usage habit information.

The content file usage habit information is renewed according to a user's usage of a content file. If the user requests to use the content file by using the user interface 320, the controller 330 performs a function according to the user's request. For example, if the user requests to reproduce a content file by using the user interface 320, the content file usage habit information generating unit 319 may generate content file usage habit information representing a reproduction frequency or renew the content file usage habit information. The content file usage habit information may comprise a date of a content file that is received from an external device (not shown) through the input unit 340 and is stored in the user terminal, a date of the content file that is edited by a user of the user terminal, the latest reproduction date of the content file, or the like. The user may personally input his/her preference on the content file. In this case, the content file usage habit information generating unit 319 may store the user's preference that is personally input by the user as the content file usage habit information. If the user terminal is a cellular phone, the content file list may comprise a contact list or an address list. In this regard, the content file usage habit information may comprise the number of calls with terminals included in the list and calling time, or the amount/level of communication with a specific terminal, which is input by the user through the user interface 320. The content file usage habit information generating unit 319 sends the generated content file usage habit information to the memory unit 350.

The memory unit 350 stores the content file usage habit information as content additional information. The content file list generating unit 311 extracts a content file list to be output from the memory unit 350 and sends the extracted content file list to the output unit 317. The additional information extracting unit 313 extracts additional information on each piece of content included in the content file list and sends the extracted content additional information to the output unit 317. The content additional information may be the content file usage habit information that is generated by the content file usage habit information generating unit 319 and is stored in the memory unit 350. The graph generating unit 315 generates a graph representing a content file usage habit degree by using the content file usage habit information having the same property on each piece of content and sends the generated graph to the output unit 317. The output unit 317 combines the information received from the content file list generating unit 311 and the additional information extracting unit 313 and displays the combined information.

FIGS. 4A through 4C are diagrams for explaining screens for displaying content information according to an exemplary embodiment of the present invention.

The content file list generating unit 211 or 311 extracts a content file list to be output from the memory unit 250 or 350. Referring to FIG. 4A, if the content file list extracted by the content file list generating unit 211 or 311 is text titles, a screen 410 displays the extracted content file list.

The additional information extracting unit 213 or 313 extracts additional information having the same information among additional information on each content file included in the content file list to be output from the memory unit 250 or 350. The property of additional information may be selected by a user or be automatically selected by a user terminal. If the selected property of additional information is file reproduction time, the additional information extracting unit 213 or 313 extracts additional information representing file reproduction time on each content file. The graph generating unit 215 or 315 ranks the extracted additional information according to the degree of the selected property of additional information. In more detail, if the selected property is file reproduction time, the graph generating unit 215 or 315 ranks additional information on each content file in the order of long or short file reproduction time. The graph generating unit 215 or 315 generates graphs representing ranking. Referring to FIG. 4B, a screen 420 displays bar graphs representing ranking according to the selected property of additional information. The bar graphs represent long and short reproduction times of each piece of content.

The output unit 217 or 317 combines the content file list screen 410 and the additional information graph screen 420, generates a content information display screen 430, and outputs the content information display screen 430. Referring to FIG. 4C, the screen output by the output unit 217 or 317 superimposes graphs representing a specific property over a content file list. The content information display screen 430 may display information 435 representing a type of additional information displayed by the graphs. The user can see content information screen displayed on a user terminal screen and easily compare the reproduction time on each piece of content. If the user terminal is a small-sized terminal, the user can see additional information on content, as well as a file list, without moving the screen by scrolling or the like. Furthermore, if the user terminal is a PC, and the user desires to use a file name displayed on the leftmost side of the screen and additional information displayed on the rightmost side of the screen, the additional information displayed on the rightmost side of the screen is generated as a graph, and the graph is superimpose on the file list, so that the user can see the file name displayed on the leftmost side of the file list and specific additional information at the same time.

Figure 5A:
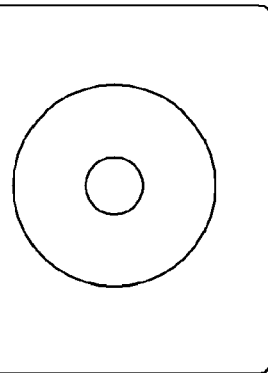
FIGS. 5A through 5D illustrate screens for displaying content information according to another exemplary embodiment of the present invention.

FIGS. 5A through 5D illustrate screens for displaying content information according to another exemplary embodiment of the present invention. The graph generating unit 215 or 315 may display additional information on each piece of content regarding each selected property using the length of a bar graph or a belt graph or another color or transparency of graphs having the same length or the like. Referring to FIG. 5A, the graph generating unit 215 or 315 display a content information display screen by displaying additional information on each piece of content, by using graphs having the same length, according to a different color, transparency, brightness, color depth or the like.

Figure 5B:
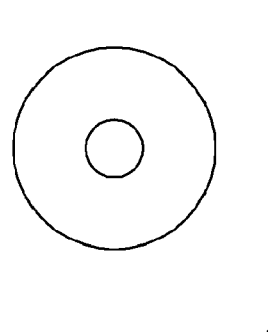
Figure 5C:
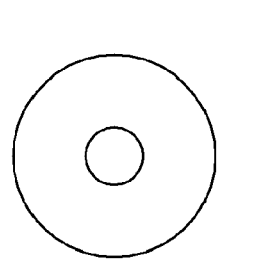

The graph generating unit 215 or 315 may use a bar graph in order to display additional information of various properties on a single screen at the same time. The bar graph uses a bar to display a ratio of each part versus the whole part. The graph generating unit 215 or 315 may generate a graph that displays additional information on each piece of content per type of additional information. Referring to FIG. 5B or 5C, the graph generating unit 215 or 315 may divide a graph of each content file by the number of types of additional information, and display additional information on a specific content file with regard to the same type of additional information of each section as a relative value of additional information on a different content file. For example, if properties of additional information such as reproduction time, license date, and preference are to be displayed, the graph generating unit 215 or 315 may divide a graph of each of six content files into three sections, and display the graphs representing additional information on reproduction time, license date, and preference sequentially from the left of each of the three sections. The length of the graph of each section may vary as shown in FIG. 5B or transparency or brightness of the graph of each section may vary as shown in FIG. 5C in order to display the degree of the additional information on each section. The user can compare a plurality of pieces of additional information on each piece of content and compare additional information on a specific content file with additional information on another content file using the bar graphs.

Figure 5D:
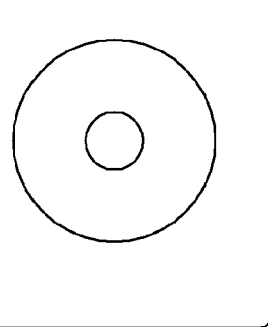

Referring to FIG. 5D, the graph generating unit 215 or 315 displays the degree of additional information using a picture graph. The picture graph may present the degree of additional information using the length of a graph similar to the bar graph. If a plurality of properties are selected, a plurality of picture graphs may be arranged.

Figure 6:
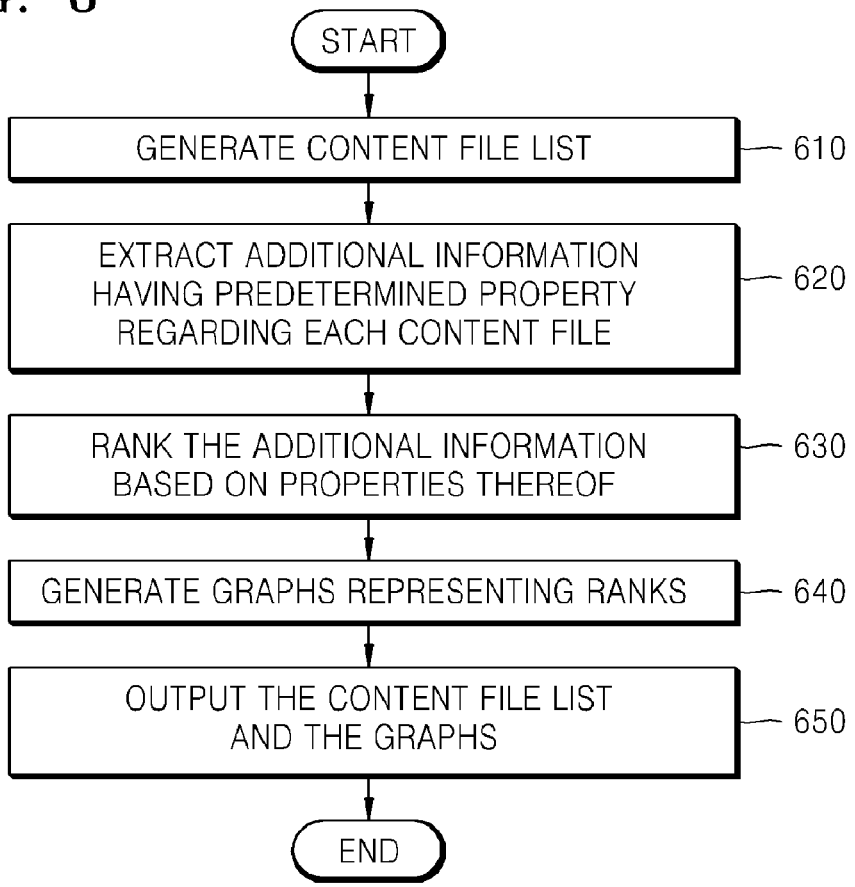
FIG. 6 is a flowchart illustrating a content information display method according to an exemplary embodiment of the present invention.

FIG. 6 is a flowchart illustrating a content information display method according to an exemplary embodiment of the present invention. Referring to FIG. 6, the content file list generating unit 211 or 311 extracts a content file list and generates the content file list (Operation 610). The additional information extracting unit 213 or 313 extract additional information having the same property regarding each content file included in the extracted content file list (Operation 620). The graph generating unit 315 generates a graph representing the additional information on each content file. The graph generating unit 315 ranks the additional information based on the properties thereof (Operation 630), and generates graphs representing ranks using length, size, color or the like (Operation 640). The output unit 317 outputs the content file list and the graphs (Operation 650).

Figure 7:
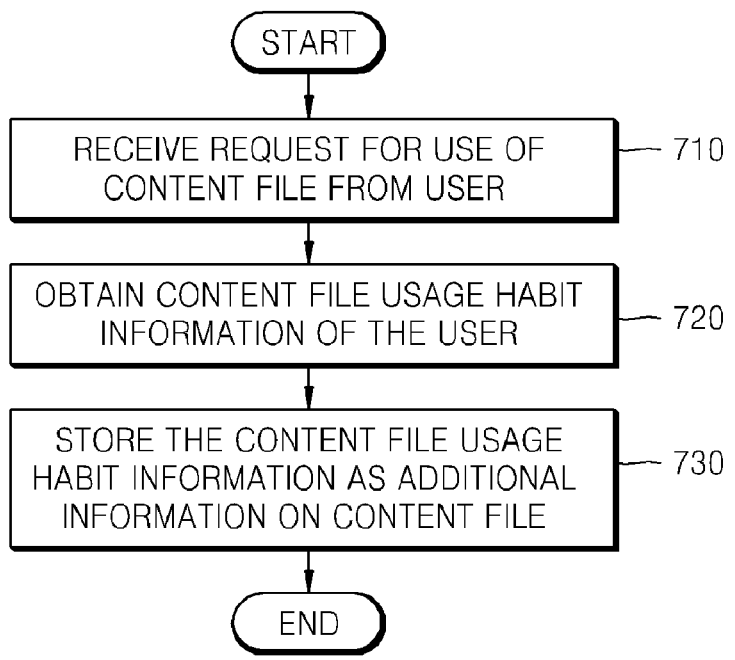
FIG. 7 is a flowchart illustrating a content information display method according to another exemplary embodiment of the present invention.

FIG. 7 is a flowchart illustrating a content information display method according to another exemplary embodiment of the present invention. Referring to FIG. 7, a user terminal receives a request for the use of a content file from a user through the user interface 320 (Operation 710). The content file usage habit information generating unit 319 acquires content file usage habit information on the user (Operation 720). The content file usage habit information generating unit 319 sends the generated content file usage habit information to the memory unit 350. The memory unit 350 stores the content file use habit information as additional information on a content file (Operation 730).

The exemplary embodiments of the present invention can provide a content file display method and apparatus for efficiently displaying a plurality of pieces of additional information on a content file when a content file list is displayed.

The exemplary embodiments of the present invention can also provide a content information display method and apparatus for displaying main information and additional information on a content file when a content file list is displayed on a small-sized screen due to the small size of a reproduction device.

The exemplary embodiments of the present invention can also provide a content information display method and apparatus for displaying additional information on a content file using a graph when a content file list is displayed.

While this invention has been particularly shown and described with reference to exemplary embodiments thereof, it will be understood by those of ordinary skill in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A method of displaying content information performed in a user terminal, the method comprising:
    extracting a content file list including items corresponding to information on content files;
    extracting additional information having a same property from among additional information on each of the content files included in the content file list;
    generating a graph representing a degree of the property by comparing the extracted additional information on each content file with additional information on another content file; and
    displaying the graph and the content file list.

2. The method of claim 1, wherein the content file list is a text file, and
    wherein the displaying the graph and the content file list comprises combining the graph and the content file list in the text file.

3. The method of claim 2, further comprising receiving a selected property of the additional information,
    wherein the extracting the additional information comprises extracting additional information having the selected property.

4. The method of claim 2, wherein the displaying the graph and the content file list comprises outputting a type of the property of the additional information generated as the graph.

5. The method of claim 2, further comprising:
    receiving a request to use one of the content files;
    generating content file usage habit information in response to the request; and
    storing the content file usage habit information as additional information on the content file whose usage is requested.

6. The method of claim 5, wherein the additional information comprises at least two of a license date, a volume, a reproduction time or information on a generator of the content file, a reproduction frequency of the content file, a preference regarding the content file that is input by a user of the user terminal, a date of storing the content file, a date of editing the content file by the user of the user terminal, and information on a latest reproduction date of the content file.

7. The method of claim 5, wherein the content file list comprises a name list or an address list, and
    wherein the content file usage habit information comprises information on a number of calls made with a terminal included in the name list or the address list, calling time, or an amount or level of communication with the terminal that is input by the user of the user terminal.

8. The method of claim 2, wherein the extracting the additional information comprises extracting additional information on each property from each of content files having a plurality of properties, and
    wherein the generating the graph comprises dividing graphs of each of the content files into sections of a number of the plurality of properties, comparing additional information on each content file with additional information on another content file using the additional information on each content file having the same property, and generating and displaying a graph representing the degree of the property in each section.

9. The method of claim 8, wherein the extracting of the additional information comprises extracting the additional information from metadata on the content file.

10. The method of claim 2, wherein the graph comprises a bar graph, a belt graph, or a picture graph, and
    wherein the generating of the graph further comprises displaying a degree of the property using at least two of a length, a size, a color, a transparency, a brightness, and a color depth of the graph.

11. The method of claim 10, wherein the transparency, the color or the size of the graph is used to identify the content file list.

12. A user terminal for displaying content information, the user terminal comprising:
    a content information display unit which compares additional information on each of content files included in a content file list including items corresponding to information on content files with additional information on another content file using the additional information having a same property of each content file, generates a graph representing a degree of the property, and displays the graph and the content file list;

a controller which controls the user terminal to display content information;

a memory unit which stores the content file list and the additional information on each content file; and a user interface which transfers a request to the user terminal.

13. The user terminal of claim 12, wherein the content information display unit comprises:

a content file list extracting unit which extracts a content file list;

an additional information extracting unit which extracts additional information having the same property among additional information on each of content files included in the content file list;

a graph generating unit which generates a graph representing the degree of the property by comparing the extracted additional information on each content file with additional information on another content file;

a display information combining unit which combines the graph and the content file list; and an outputting unit which displays the graph and the content file list.

14. The user terminal of claim 13, wherein the content file list is a text file, and wherein the output unit displays the graph by combining the graph and the content file list in the form of the text file.

15. The user terminal of claim 13, wherein the controller receives a selected property of the additional information through the user interface, and wherein the additional information extracting unit extracts additional information having the selected property.

16. The user terminal of claim 13, wherein the output unit outputs a type of the property of the additional information generated as the graph.

17. The user terminal of claim 13, wherein the user interface receives a request to use the content files from a user of the user terminal, and wherein the user terminal further comprises a content file usage habit information generating unit which generates content file usage habit information in response to the request.

18. The user terminal of claim 17, wherein the additional information comprises at least two of a license date, a volume, a reproduction time or information on a generator of the content file, a reproduction frequency of the content file, a preference regarding the content file that is input by a user of the user terminal, a date of storing the content file, a date of editing the content file by the user of the user terminal, and information on a latest reproduction date of the content file.

19. The user terminal of claim 17, wherein the content file list includes a name list or an address list, and wherein the content file usage habit information comprises information on a number of calls made with a terminal included in the person list or the address list, a calling time, or an amount or level of communication with the terminal that is input by the user of the user terminal.

20. The user terminal of claim 13, wherein the additional information extracting unit extracts additional information on each property from each of content files having a plurality of properties, and wherein the graph generating unit divides graphs of each of the content files into sections of a number of the plurality of properties, compares additional information on each content file with additional information on another content file using the additional information on each content file having the same property, and generates and displays a graph representing the degree of the property in each section.

21. The user terminal of claim 13, wherein the additional information extracting unit extracts the additional information from metadata on the content file.

22. The user terminal of claim 13, wherein the graph comprises a bar graph, a belt graph, or a picture graph, and wherein the graph generating unit displays a degree of the property using at least two of a length, a size, a color, a transparency, a brightness, and a color depth of the graph.

23. The user terminal of claim 22, wherein a transparency, a color or a size of the graph is used to identify the content file list.

* * * * *